United States Patent [19]

Abraham et al.

[11] Patent Number: 5,151,987
[45] Date of Patent: Sep. 29, 1992

[54] RECOVERY OBJECTS IN AN OBJECT ORIENTED COMPUTING ENVIRONMENT

[75] Inventors: Robert L. Abraham; Michael P. Priven, both of Marietta; Thomas P. Moorman, Atlanta, all of Ga.

[73] Assignee: International Business Machines Corporation, Armonk, N.Y.

[21] Appl. No.: 602,443

[22] Filed: Oct. 23, 1990

[51] Int. Cl.⁵ ...................... G06F 15/00; G06F 12/00
[52] U.S. Cl. ..................................... 395/575; 371/12
[58] Field of Search ...................... 371/12; 364/285.2; 395/575

[56] References Cited

U.S. PATENT DOCUMENTS 4,853,843 8/1989 Ecklund .

OTHER PUBLICATIONS

W. J. Sohn, "Extended-Arm Rotary Actuator for Magnetic Recording Disk Drive" IBM Technical Disclosure Bulletin vol. 32, No. 6A, Nov. 1989, pp. 112-114.
Bennett, et al., "Object Creation Mechanism for an Object Management System", IBM Technical Disclosure Bulletin vol. 18, No. 5, Oct. 1975 pp. 1361-1364.

Primary Examiner—Vincent P. Canney
Attorney, Agent, or Firm—Sterne, Kessler, Goldstein & Fox

[57] ABSTRACT

The present invention is directed to systems and methods for recovering from unplanned failures in object oriented computing environments. The systems and methods of the present invention recover from unplanned failures in an efficient manner by storing recovery information in recovery objects. During recovery operations from an unplanned failure, object instance methods (which were abnormally terminated by the unplanned failure) use the recovery information to identify committable actions which were executed prior to the unplanned failure. The object instance methods then execute committable actions which were not executed prior to the unplanned failure. Thus, according to the present invention, the committable actions which were executed prior to the unplanned failure are not re-executed, and the committable actions which were not executed prior to the planned failure are executed.

29 Claims, 8 Drawing Sheets

RECOVERY OBJECTS IN AN OBJECT ORIENTED COMPUTING ENVIRONMENT

A portion of the disclosure of this patent document contains material which is subject to copyright protection The copyright owner has no objection to the facsimile reproduction by anyone of the patent disclosure, as it appears in the Patent and Trademark Office patent files or records, but otherwise reserves all copyright rights whatsoever.

CROSS-REFERENCE TO OTHER APPLICATIONS

The following application of common assignee contains some common disclosure, and is believed to have an effective filing date identical with that of the present application:

A messenger and object manager to implement an object oriented enviroment Ser. No. 7/602,442.

BACKGROUND OF THE INVENTION

1. Field of the Invention

The present invention relates to systems and methods for providing recovery capabilities in object oriented computing systems (also called object oriented computing environments). In particular, the present invention relates to systems and methods which use recovery objects to provide such recovery capabilities.

2. Discussion of Related Art

Unplanned failures of computer hardware and/or software may result in database inconsistency. A database is inconsistent if it contains data that is in an intermediate state, and the data is visible (that is, accessible) to users. If the database is not inconsistent, then the database is said to be consistent. Alternatively, the database is said to be in a consistent state.

For example, in a banking computer system having a bank database, a typical computer program may contain the following two operations.

TABLE 1

Operation 1: Withdraw $100 from John Smith's checking account.

Operation 2: Deposit $100 into John Smith's savings account.

Suppose John Smith's initial checking account balance is $1000 and initial savings account balance is $1000. If both Operations 1 and 2 successfully complete, then the bank database would be consistent. The final checking account balance would be $900 and the final savings account balance would be $1100.

However, if only Operation 1 completes due to an unplanned failure with the banking computer system, then the bank database would be inconsistent. The final checking account balance would be $900 but the final savings account balance would be $1000.

A prior solution to the problem presented in Table 1 involves the use of computing systems which support atomic units of work. An atomic unit of work includes database operations which should be performed together (such as Operations 1 and 2, above). In computing systems which support atomic units of work, the database operations (within the atomic unit of work) are performed as an indivisible, atomic operation. In other words, either all the database operations (within the atomic unit of work) successfully complete, or none of the database operations successfully complete The database operations write data to the database. The data written to the database are called database changes. For the database operations to successfully complete, the database changes must be visible (that is, accessible) in the database. The database changes are not visible until they are committed to the database In this disclosure, the database operations are called committable actions. The database changes are called committable data. Thus, the committable actions produce the committable data. A "commit" command or message is used to commit the committable data to the database. A "rollback" command or message is used to cancel the committable actions, such that the committable data are not committed to the database.

The problem in Table 1 is solved according to the prior solution by adding an Operation 3 as follows.

TABLE 2

Operation 1: Withdraw $100 from John Smith's checking account.

Operation 2: Deposit $100 into John Smith's savings account.

Operation 3: Commit.

The commit command in Operation 3 ensures that either (1) the database changes in Operations 1 and 2 are both visible in the bank database, or (2) the database changes in Operations 1 and 2 are not visible in the bank database.

However, the prior solution described above is inadequate when computer programs contain multiple committable actions and commit commands, and the committable actions cannot safely be re-executed. For example, consider the computer program in Table 3.

TABLE 3

```
main( )
{
    calc( );
    commit( );
    save( );
    commit( );
    del( );
    commit( );
};
```

Suppose calc(), save(), and del() contain committable actions Suppose also that calc(), save(), and the first two commit(),s successfully complete before an unplanned failure occurs. In other words, del() and the last commit() are not executed Conventionally, there are two options to recover from the unplanned failure. First, main() may be re-executed. This option is inadequate since it may not be possible to safely re-execute the committable actions in calc() and save().

Second, main() may be flushed (that is, not re-executed). This option is also inadequate since del() will never execute.

The problem presented in Table 3 also exists in object oriented computing systems where methods contain multiple committable actions and commit messages, and the committable actions cannot safely be re-executed. Specifically, the problem presented in Table 3 exists during interactive, batch, and remote processing in the object oriented computing systems Interactive processing occurs when users are working with the object oriented computing systems in real-time via terminals During interactive processing, the users submit interactive user commands to the object oriented computing systems for processing. Conventionally, the object oriented computing systems process the interactive user commands by issuing messages to objects. The messages invoke methods, and the methods perform the functions specified by the interactive user commands.

The problem presented in Table 3 exists during interactive processing if the methods contain multiple committable actions and commit messages, and the committable actions cannot safely be re-executed, and the users do not have direct access to the committable actions (that is, the users cannot manually perform the committable actions).

Batch processing occurs when users submit batch user commands to the object oriented computing systems for processing at a later time. Conventionally, in object oriented computing systems the batch user commands are represented by objects. These objects are called Queued Message Requests (QMR). The QMRs are placed on a queue for later scheduling and processing by the object oriented computing systems.

The problem presented in Table 3 exists during batch processing if the methods associated with the QMRs contain multiple committable actions and commit messages, and the committable actions cannot safely be re-executed.

Remote processing occurs when users submit remote user commands to the object oriented computing systems for processing in remote computing environments. Conventionally, in object oriented computing systems the remote user commands are represented by QMRs. The QMRs are sent to the remote computing environments for processing.

The problem presented in Table 3 exists during remote processing if the methods associated with the QMRs contain multiple committable actions and commit messages, and the committable actions cannot safely be re-executed.

A prior solution to the problem presented in Table 3 involves the use of checkpoints. According to this prior solution, the computing system periodically stores images of the entire computing environment in non-volatile storage. The images represent snapshots, or checkpoints, of the computing environment. The computing system recovers from unplanned failures by going back to the most recent snapshot. Operation of the computing system then resumes from the point at which the snapshot was taken.

However, the prior solution is inefficient because the prior solution stores more data than is necessary to recover from unplanned failures. As a result, processing time and data storage capacity are wasted.

SUMMARY OF THE INVENTION

The present invention is directed to computer application programs which operate in object oriented computing environments and which interact with persistent objects to perform some work, wherein the work involves storing information to a non-volatile storage device, and wherein the persistent objects include methods which have multiple committable actions and commits, and wherein the committable actions cannot safely be re-executed.

In particular, the present invention is directed to systems and methods of the computer application programs for providing recovery capabilities The recovery capabilities are used to recover from unplanned failures in the object oriented computing environments. The recovery capabilities are implemented using recovery objects.

The present invention is further directed to systems and methods of the computer application programs for providing recovery capabilities in the object oriented computing environments in an efficient manner, such that processing time and data storage capacity to effect the recovery capabilities are minimized.

The present invention provides recovery capabilities in an efficient manner by storing recovery information in recovery objects. The recovery information stored in the recovery objects is limited to only that information which is necessary to recover from unplanned failures.

During recovery operations from an unplanned failure, methods (which were abnormally terminated by the unplanned failure) use the recovery information to identify committable actions which were executed prior to the unplanned failure. The methods then execute committable actions which were not executed prior to the unplanned failure. Thus, according to the present invention, the committable actions which were executed prior to the unplanned failure are not re-executed, and the committable actions which were not executed prior to the planned failure are executed.

Because the recovery information is limited to only that information which is necessary to recover from unplanned failures, the processing time and data storage capacity to effect the recovery capabilities are minimized.

A better appreciation of these and other advantages and features of the present invention, as well as how the present invention realizes them, will be gained from the following detailed description and drawings of the various embodiments, and from the claims.

BRIEF DESCRIPTION OF THE DRAWINGS

The present invention will be described with reference to the accompanying drawings, wherein.

DETAILED DESCRIPTION OF THE PREFERRED EMBODIMENTS 1.0. Object Oriented Computing System Concepts This section provides a brief description of object oriented computing system concepts which are pertinent to the present invention. A more detailed description of the concepts discussed in this section is found in a number of references, including Shlaer, S. and Mellor, S.J., *Object-Oriented Systems Analysis* (Yourdon Press Computing Series, 1988), Booch, G., *Object Oriented Design With Applications* (The Benjamin/Cummings Publishing Company, 1990), and Meyer, B., *Object Oriented Software Construction* (Prentice Hall, 1988).

Object oriented computing systems contain object instances. The object instances are referenced by object identifiers The object instances are grouped into object classes.

Figure 1:
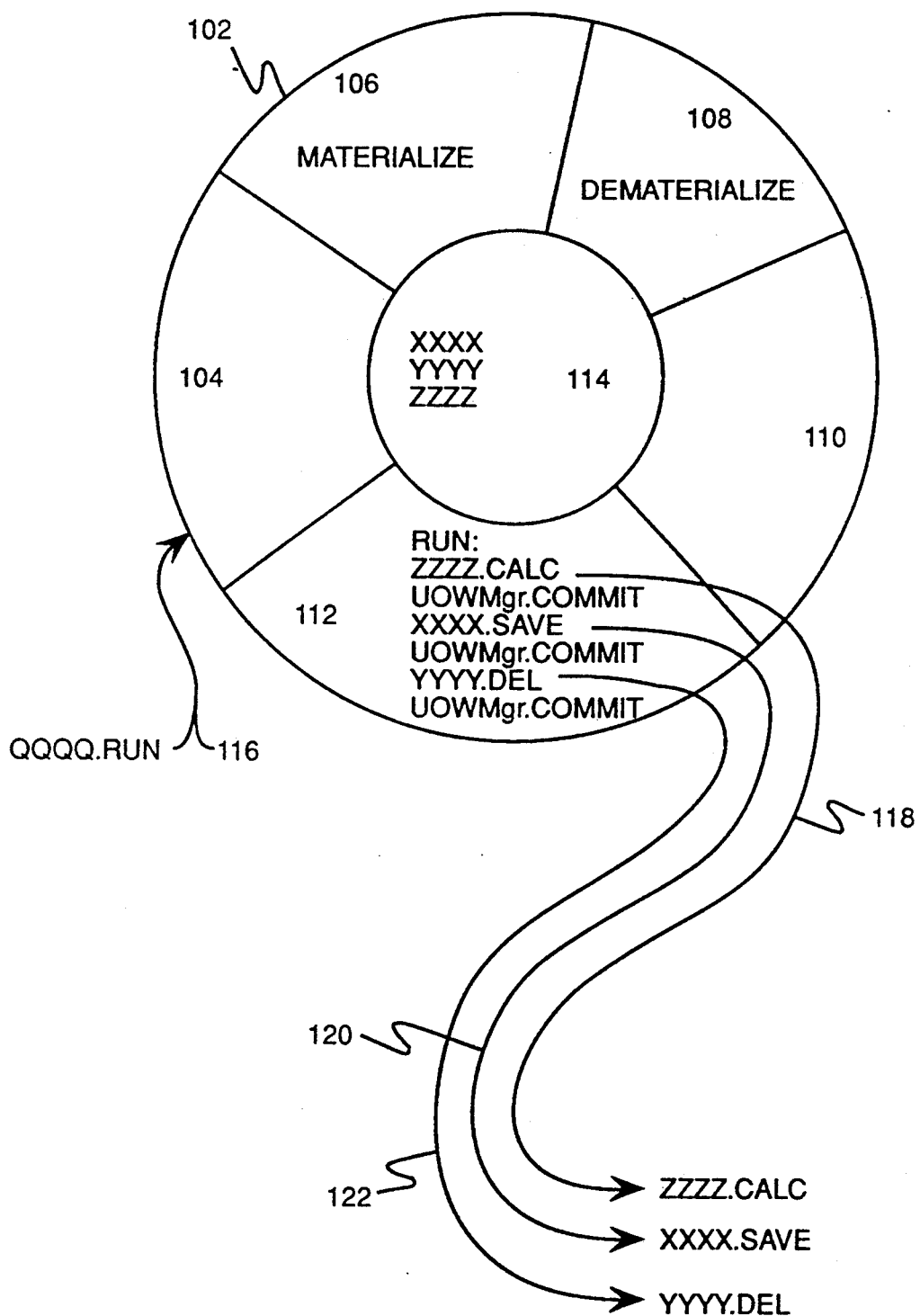
FIG. 1 shows a graphical representation of a known object instance.

FIG. 1 presents a graphical representation of a known object instance 102. The object instance 102 is referenced by an object identifier QQQQ. The object instance 102 contains data 114 (also called attributes) and functions 104, 106, 108, 110, 112 (also called methods). The attributes 114 may include references to other object instances.

The object instance 102 could represent an object instance which was created during interactive processing to represent an interactive user command. Alternatively, the object instance 102 could represent a Queued Message Request (QMR) which was created during batch or remote processing. The QMR would represent a batch user command or a remote user command, respectively.

Figure 2:
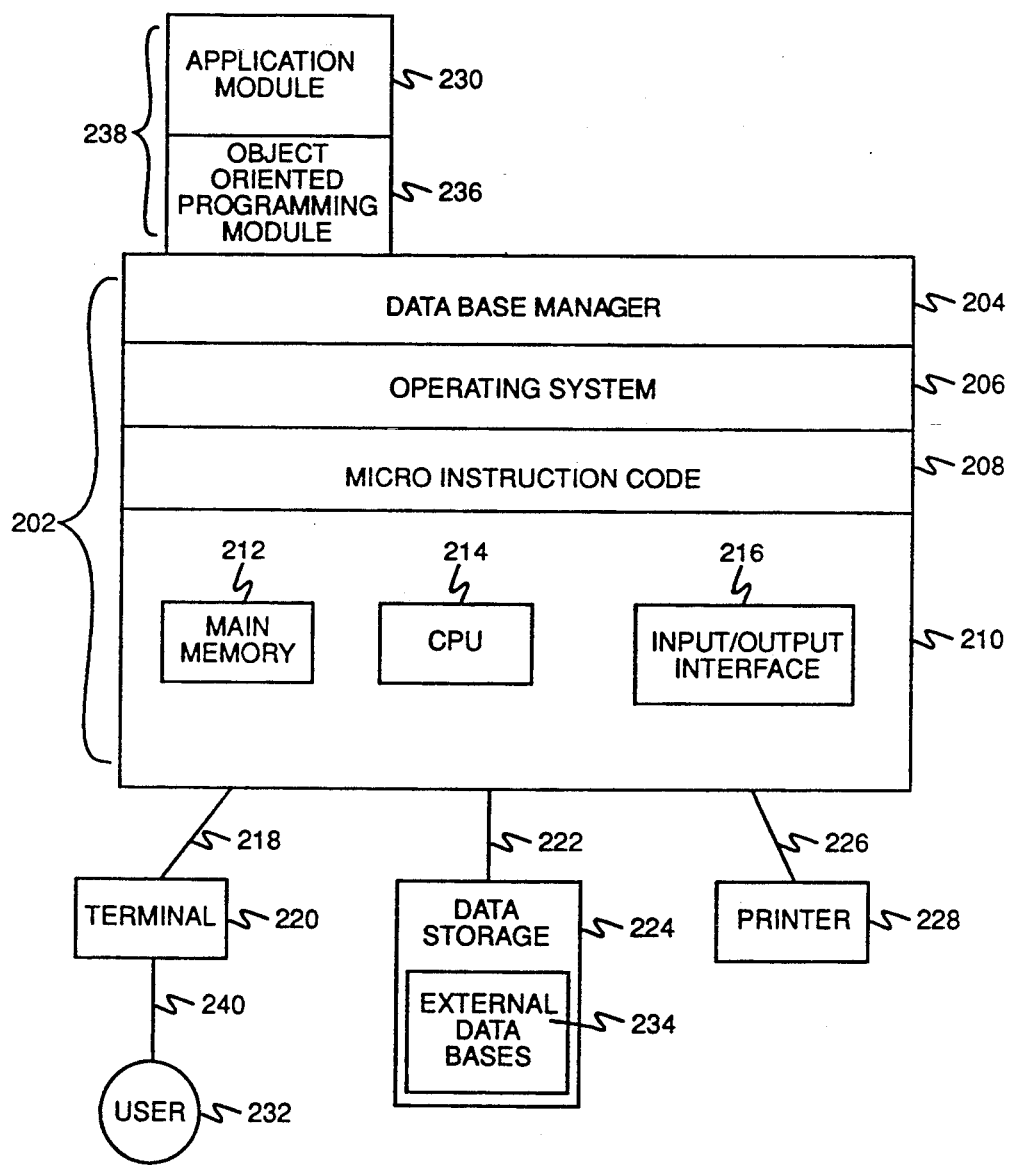
FIG. 2 shows a graphical representation of a computing environment in which the present invention operates.

In the discussion below, elements from FIG. 2 are referenced. FIG. 2 presents a graphical representation of the computing environment in which the present invention operates. FIG. 2 is discussed in detail in Section 2.

Generally, object instances are either persistent (non-volatile) or non-persistent (volatile). The object instance 102 shown in FIG. 1 is a persistent object instance. The data 114 associated with the persistent object instance 102 are stored in external databases 234. The external databases 234 are maintained in a secondary storage 224.

The persistent object instance 102 contains methods 106 (called materialize methods 106 and discussed below) to read the data 114 from the external databases 234. (In this disclosure, methods associated with persistent objects are also referred to as persistent object methods). The persistent object instance 102 further contains methods 108 (called dematerialize methods 108 and discussed below) to write the data 114 to the external databases 234. Note that there is a difference between writing the data 114 and committing the data 114 to the external databases 234. Specifically, the data 114 which are written to the external databases 234 (using the dematerialize methods 108) are not visible in the external databases 234 until the data 114 are committed to the external databases 234.

The materialize methods 106 are used to load the data 114 into a main memory 212 for processing by the methods 104, 110, 112. While processing, the methods 104, 110, 112 modify the data 114. The methods 104, 110, 112 may also modify data in other object instances.

When the data 114 is in a consistent state, one of the methods 104, 110, 112 sends a commit message to a unit of work manager 306. The unit of work manager 306, working with an object manager 304, causes the dematerialize methods 108 to write the data 114 to the external databases 234. Once the dematerialize methods 108 complete, the unit of work manager sends a commit command to a database manager 204. In response to the commit command, the database manager 204 ensures that the data 114 is visible in the external databases 234. The operation of the unit of work manager 306 and the object manager 304 are discussed in detail below.

The data 114 associated with non-persistent object instances are not stored in the external databases 234. Also, the non-persistent object instances do not include materialize methods 106 and dematerialize methods 108.

The known operation of the object instance 102 in an object oriented computing environment 236 is described below.

A message QQQQ.RUN 116 is sent to the object 102. The message 116 may be sent in a number of ways, including from a user 232 via a terminal 220 and from a method associated with another object instance.

"QQQQ" in the message 116 identifies the destination object instance 102. "RUN" in the message 116 identifies the method 112 to be executed. Thus, the message 116 invokes the method 112 in the object instance 102.

Upon being invoked, the method 112 issues messages 118, 120, and 122. The message 118 invokes a method CALC in an object instance ZZZZ. Similarly, the message 120 invokes a method SAVE in an object instance XXXX. Similarly, the message 122 invokes a method DEL in an object instance YYYY.

If the methods CALC, SAVE, and DEL include committable actions which cannot be safely re-executed, and since the RUN method 112 contains multiple commit messages (the commit messages in the RUN method 112 are represented by "UOWMgr.-COMMIT"), then the problem presented in Table 3 above exists in the computing environment 236 with respect to the 10 object instance 102.

Additionally, since the object instance 102 could be used during interactive, batch, and remote processing, the problem presented in Table 3 above exists in the computing environment 236 with respect to the object instance 102 during interactive, batch, and remote processing. 2.0. Overview Of The Present Invention As shown in FIG. 2, the present invention is a computer application program 238 which operates on a computer platform 202. The computer platform 202 includes hardware units 210 including a central processing unit (CPU) 214, a main memory 212, and an input/output interface 216. The main memory 212 may be real storage or paged virtual memory.

The computer platform 202 also includes microinstruction code 208, an operating system 206, and a database manager 204. Various peripheral components may be connected to the computer platform 202, such as a terminal 220, a data storage device 224, and a printing device 228. The database manager 204 supports commit commands. The data storage device 224 is also called a secondary storage 224 and may include hard disks and tape drives. The data storage device 224 represents non-volatile storage. External databases 234 are stored on the secondary storage 224.

Users 232 interact with the computer platform 202 and the application program 238 via the terminal 220.

In the preferred embodiment of the present invention 238, the computer platform 202 includes a computer having an IBM System 370 architecture. The operating system 206 which runs thereon is an IBM Multiple Virtual Storage (MVS). The database manager 204 is an IBM DB2, which is a relational database manager. Also, the application program 238 is preferably written in Intermediate C, which is an object oriented dialect of the C computer programming language. Intermediate C is similar to the C++ computer programming language.

The computer application program 238 includes an application module 230 and an object oriented computing environment module 236. The present invention is directed to those aspects of the object oriented computing environment module 236 and the application module 230 which provide recovery capabilities. In other words, the present invention is directed to the systems and methods of the application module 230 and the object oriented computing environment module 236 which provide recovery capabilities.

The present invention may be viewed as a combination 238 of an application program 230 and an object oriented computing environment 236. According to this view of the present invention, the application program 230 would conceptually operate on top of the object oriented computing environment 236 and the object oriented computing environment 236 would operate on top of the database manager 204.

Figure 3:
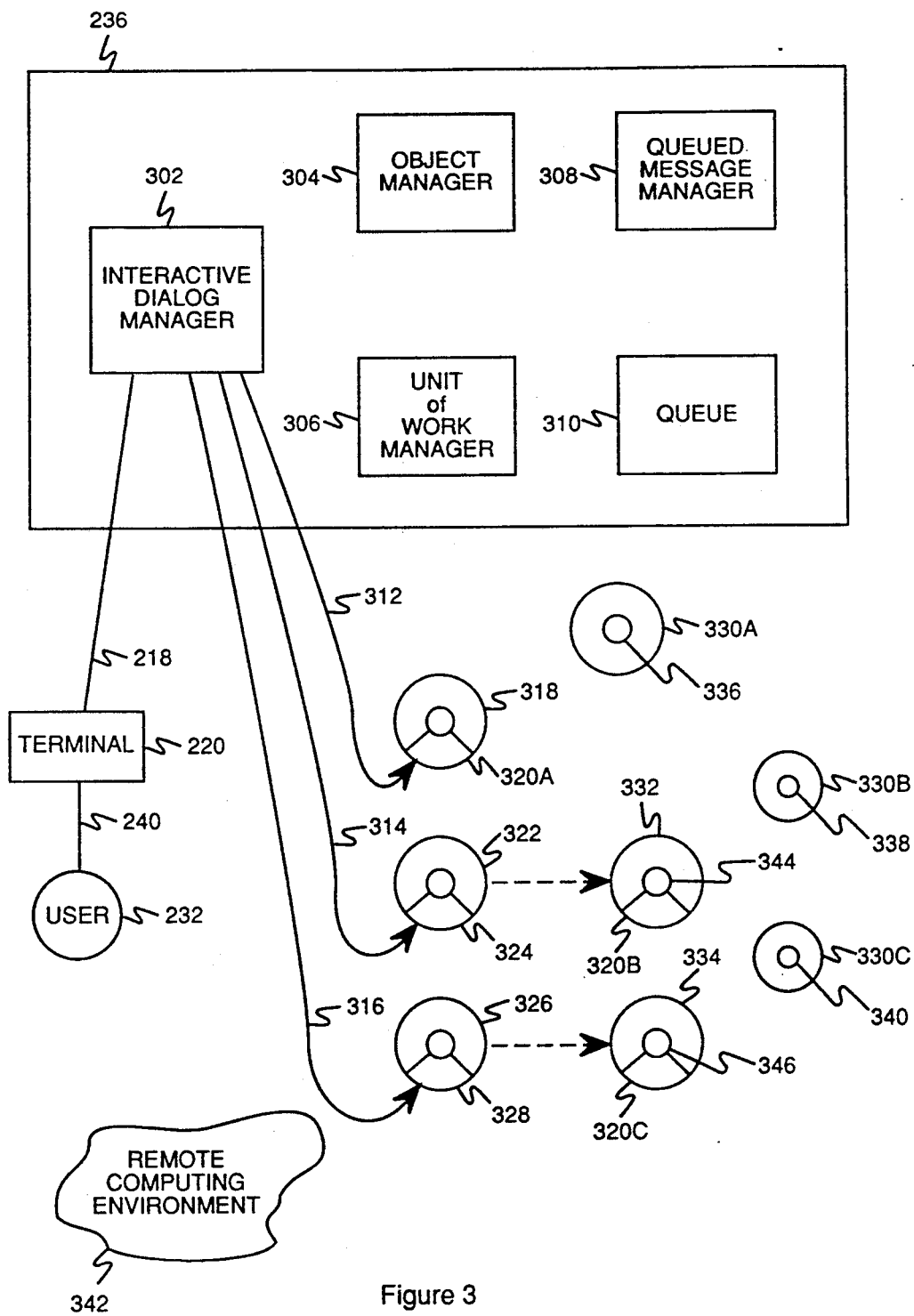
FIG. 3 shows a structural diagram of an object oriented computing environment module.

FIG. 3 presents a structural diagram of the object oriented computing environment module 236. Selected components from the computer platform 202 and the application module 230 are also presented in FIG. 3.

As shown in FIG. 3, the object oriented computing environment module 236 includes an interactive dialog manager 302, a queued message manager 308, a queue 310, an object manager 304, and a unit of work manager 306.

The interactive dialog manager 302 interacts with the user 232 and with objects 318, 322, 326 existing in the application program module 230. The interactive dialog manager 302 receives user commands during interactive, batch, and remote processing and sends messages 312, 314, 316 to appropriate objects 318, 322, 326 to implement the user commands.

Figure 5:
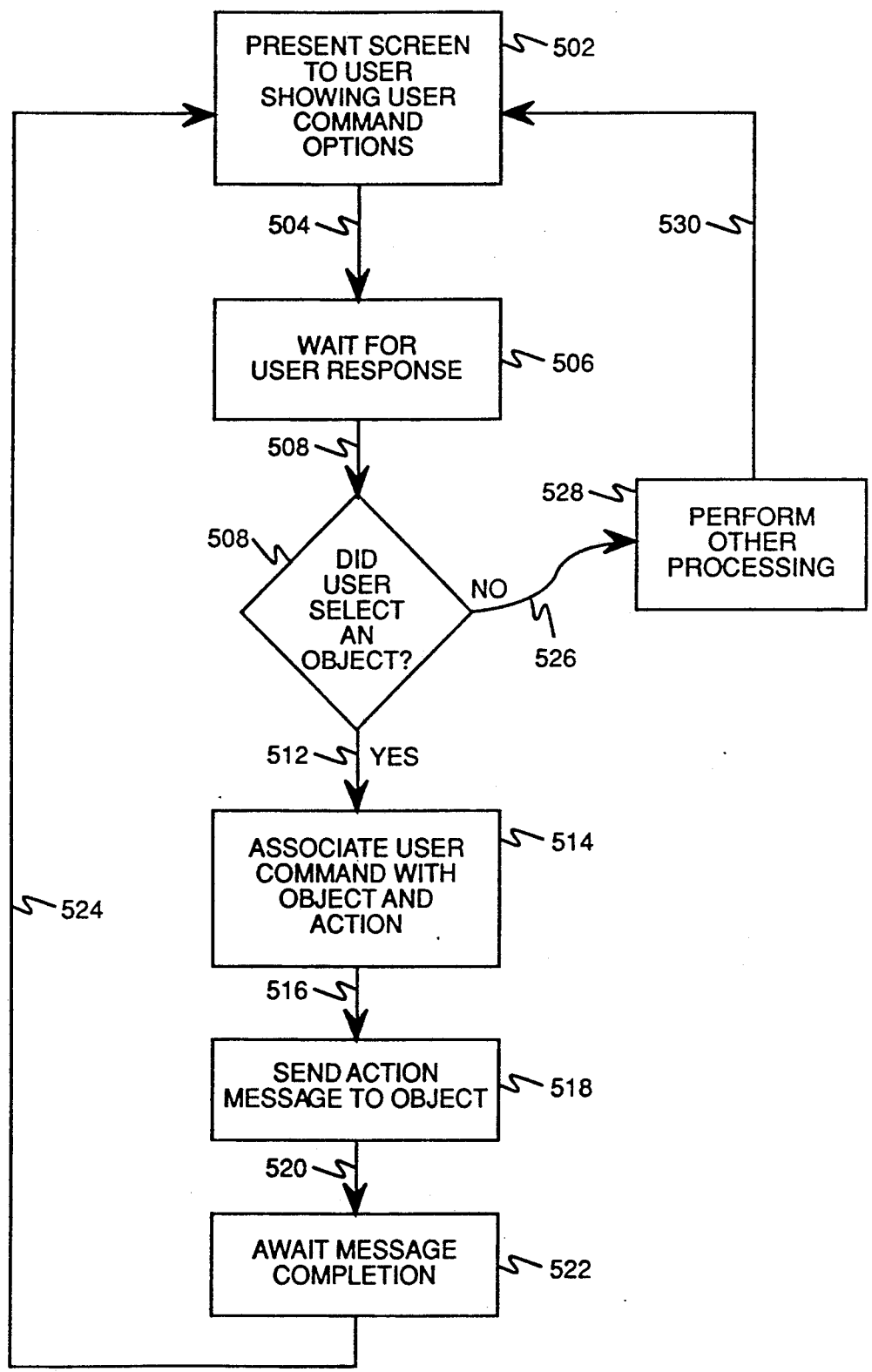
FIG. 5 shows an operational flowchart of an interactive dialog manager.

An operational flowchart of the interactive dialog manager 302 is presented in FIG. 5.

In Step 502, the interactive dialog manager 302 displays a user option screen on the terminal 220. The user option screen may contain an object representations list and an action representations list. The specific contents of the user option screen depends on the specific function of the application module 230 and, in fact, the interactive dialog manager 302 interacts with the application module 230 when displaying the user option screen.

For example, if the application module 230 implements an automated banking teller machine, then the user option screen may include such object representations as SAVINGS ACCOUNT, CHECKING ACCOUNT, and LOAN ACCOUNT. The user option screen may also include such action representations (also called command options) as BALANCE, WITHDRAW, DEPOSIT, and TRANSFER.

In Step 506, the interactive dialog manager 302 waits for and receives a user response, wherein the user response includes both a selected command option and a selected object representation. For example, WITHDRAW from SAVINGS ACCOUNT.

In Step 510, the interactive dialog manager 302 determines if the user response corresponds to a user 10 command that is implemented with a persistent object method. If the user response does not correspond to a user command that is implemented with a persistent object method, then in Step 528 the interactive dialog manager 302 performs other processing that is indicated by the user response. Such other processing includes displaying other user option screens and exiting the application module 230. After completing Step 528, the interactive dialog manager 302 reloops to Step 502.

If the user response does correspond to a user command that is implemented with a persistent object method, then in Step 514 the interactive dialog manager 302 identifies a persistent object (according to the selected object representation) which contains a persistent object method (according to the selected command option) that can perform the function indicated by the user response. The interactive dialog manager 302 then associates the user response with the identified persistent object and persistent object method.

In Step 518, the interactive dialog manager 302 sends an action message to the identified persistent object to invoke the identified persistent object method.

In Step 522, the interactive dialog manager 302 waits for a completion message from the identified persistent object method. Upon receiving the completion message, the interactive dialog manager 302 reloops to Step 502. Prior to relooping, the interactive dialog manager 302 may send a completion message to the user 232 via the terminal 220.

Referring again to FIG. 3, the queue 310 contains queued message requests (QMR). The QMRs are placed on the queue 310 during batch and remote processing. The manner in which the QMRs are placed on the queue 310 and the content of the QMRs are discussed in detail in Section 3.

The queued message manager 308 manages the queue 310. An operational flowchart of the queued message manager 308 is presented in FIG. 4.

In Step 402, the queued message manager 308 selects a QMR from the queue 310 to execute. The queued message manager 308 makes its selection according to some selection policy, such as first-in-first-out, priority, or quickest to run.

In Step 406, the queued message manager 308 sends a RUN message to the selected QMR. The RUN message invokes a RUN method in the selected QMR.

In Step 410, the queued message manager 308 waits for and receives a completion message from the RUN method in the selected QMR.

In Step 414, after receiving the completion message in Step 410, the queued message manager 308 removes the QMR from the queue 310 and reloops to Step 402.

Referring again to FIG. 3, the object manager 304 and the unit of work manager 306 work together to retrieve the data 114 associated with the persistent object instances 102 from the external databases 234 and to write and commit the committable data 114 to the external databases 234.

The object manager 304 maintains information about the persistent object instances 102. The information maintained by the object manager 304 includes a list of the persistent object instances 102, a list of the persistent object instances 102 which are in main memory 212, and a list of the persistent object instances 102 whose methods (and committable actions contained therein) have produced committable data.

The information maintained by the object manager 304 also includes a list of units of work and the persistent objects 102 which are in the units of work. A unit of work defines a program segment which contains committable actions. Commit messages to the unit of work manager 306 affect only the committable actions in the units of work where the commit messages are sent. For example, if units of work UOW_1 and UOW_2 exist, then a commit message sent from the unit of work UOW_1 affects only the committable actions in the unit of work UOW_1.

The information maintained by the object manager 304 are stored in information tables. The information tables are maintained in the main memory 212.

The unit of work manager 306 receives and processes commit messages from methods (the commit messages are represented by "UOWMgr COMMIT" in FIG. 1 and Table 4). The unit of work manager 306 is an object instance. Upon receiving a commit message from a method, the unit of work manager 306 communicates with the object manager 304 to determine the unit of work associated with the method. The unit of work manager 306 further communicates with the object manager 304 to determine the committable data in the unit of work associated with the method. The unit of work manager 306 also determines the persistent object instances 102 associated with the committable data.

Then, the unit of work manager 306 sends messages to dematerialize methods 108 in the persistent object instances 102 associated with the committable data. In response to the messages from the unit of work manager 306, the dematerialize methods 108 interact with the database manager 204 to write the committable data to the external databases 234.

After the dematerialize methods 108 have completed their writes to the external databases 234, the unit of work manager 306 sends a commit command to the database manager 204. In response to the commit command, the database manager 204 commits the committable data in the external databases 234.

The unit of work manager 306 is described in greater detail in a co-pending, commonly assigned application Ser. No. 425,607, filed Oct. 23, 1989, titled Unit of Work for Preserving Data Integrity of a Database, the disclosure of which in its entirety is incorporated herein by reference.

The object manager 304 is further described in a co-pending, commonly assigned application with an effective filing date that is believed to be identical with that of the present application, titled: A Messenger And Object Manager to Implement An Object Oriented Environment Ser. No. 7/602,442 the disclosure of which in its entirety is incorporated herein by reference.

3.0. Modes of Operation Of The Present Invention

As noted above, the present invention is directed to computer application programs which operate in object oriented computing environments and which interact with persistent objects to perform some work, wherein the work involves storing information to a non-volatile storage device, and wherein the persistent objects include methods which have multiple committable actions and commit messages, and wherein the committable actions cannot safely be re-executed.

In particular, the present invention is directed to particular systems and methods of the computer application programs for providing recovery capabilities in the object oriented computing environments by using recovery objects.

The systems and methods of the present invention for providing recovery capabilities are adapted and intended to operate in at least three processing modes: interactive processing, batch processing, and remote processing. These modes of operation are discussed in the following subsections.

3.1. Interactive Processing

Figure 6:
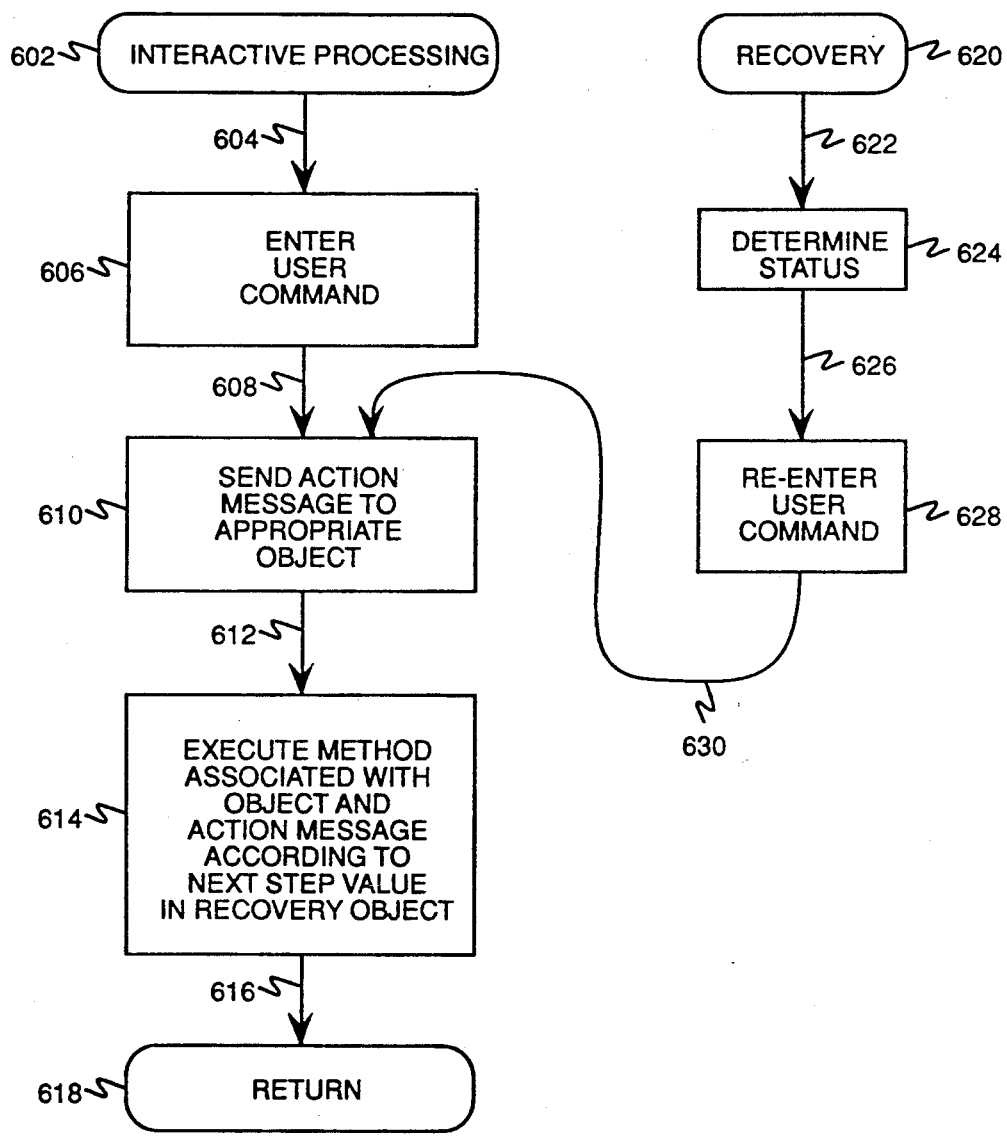
FIG. 6 shows an operational flowchart of the present invention while operating in an interactive processing mode.

Interactive processing occurs when the users 232 are working with the application program 238 of the present invention in real-time via the terminals 220. FIG. 6 presents an operational flowchart of the application program 238 while operating in the interactive processing mode. FIG. 6 focuses on the manner in which the application program 238 prepares for and recovers from unplanned failures.

Referring to FIGS. 3 and 6, in Step 606 the user 232 enters a user command The user command is sent to the interactive dialog manager 302. Recall that the user command includes both the selected command option and the selected object representation (as discussed above with reference to FIG. 5).

In Step 610, the interactive dialog manager 302 identifies a persistent object which contains a persistent object method that can perform the function indicated by the user command. As shown in FIG. 3, the interactive dialog manager 302 identifies a persistent object 318.

The persistent object 318 exists in the application module 230. The persistent object 318 includes a RUN method 320A. The content of the RUN method 320A is discussed below.

A recovery object 330A is associated with the persistent object 318. The recovery object 330A is persistent. The recovery object 330A is created and initialized at the same time that the associated persistent object 318 is created. The recovery object 330A contains recovery data 336. The recovery data 336 is used to recover from unplanned failures. The manner in which the recovery object 330A is initialized is discussed below.

Further in Step 610, the interactive dialog manager 302 associates the user command with the persistent object 318 and the RUN method 320A. Then, the interactive dialog manager 302 sends a RUN message 312 to the persistent object 318 to invoke the RUN method 320A. Note that Steps 606 and 610 in FIG. 6 are equivalent to Steps 502, 506, 510, 514, and 518 in FIG. 5.

In Step 614, the RUN method 320A is executed. During its execution, the RUN method 320A periodically updatese the recovery information 336. While the RUN method 320A is executing, the object manager 304 and the unit of work manager 306 commit committable data to the external databases 234 when so directed by the commit messages (that is, the UOWMgr.-COMMIT messages). The object manager 304 and the unit of work manager 306 also commit the recovery data 336 in the recovery object 330A to the external databases 234 as part of the same atomic unit of work. Thus, either (1) the committable data and the recovery data 336 are both committed, or (2) neither the committable data and the recovery data 336 are committed.

A computer software template for the persistent object 318 is presented in Table 4. Note that the computer software template in Table 4 includes a general format for the RUN method 320A. Also note that the RUN method 320A is numbered to facilitate the explanation below. The computer software template and, in particular, the RUN method 320A in Table 4 includes instructions to implement the recovery systems and methods of the present invention. Thus, the persistent object methods 320A which have multiple committable actions are implemented in the application module 230 of the present invention in the manner shown in Table 4.

TABLE 4

Class Sample_Object
    Data Attributes
        RO:             Recovery_Object
        UOWMgr:     Unit_of_Work_Manager
    Methods
        Run_Method:
1             If RO Exists
2             Then Do;

TABLE 4-continued

```
3                If RO.Next_Step = 1
4                Then
5                        Issue First Message
6                        RO.Assign_Next_Step(2)
7                        UOWMgr.COMMIT
8                If RO.Next_Step = 2
9                Then
10                       Issue Second Message
11                       RO.Assign_Next_Step(3)
12                       UOWMgr.COMMIT
13
14                   .
15                   .
16                   .
17
18               If RO.Next_Step = 8
19               Then
20                       Issue Last Message
21                       RO.Delete
22                       UOWMgr.COMMIT
23           End-Do;
24           Else
25               No-op;
26    End Run_Method
End Sample_Object
```

Copyright © 1990 International Business Machines Corporation, all rights reserved.

The operation of the application program 238 during Step 614 is described in additional detail below with reference to FIG. 3 and Table 4.

In Line 1 of Table 4, the RUN method 320A determines if the recovery object 330A exists. If the recovery object 330A exists, then the RUN method 320A uses the recovery data 336 to determine which instructions in the RUN method 320A to execute.

At a minimum, the recovery data 336 includes a counter. The counter identifies a step in the RUN method 320A which is to be executed next. In Table 4, the variable "RO.Next_Step" represents the counter The recovery data 336 may also include return values and any other state data which are required by subsequent steps in the RUN method 320A.

The counter is always initialized to identify the first step (starting at Line 3 in Table 4) in the RUN method 320A, so that when the RUN method 320A is first executed, the first step to be executed is the first step in the RUN method 320A. Thus, with respect to the RUN method 320A shown in Table 4, the counter is initialized to 1.

Lines 5-7, associated with the If statement at Line 3, are executed since the counter equals 1. Lines 5-7 correspond to the first step of the RUN method 320A.

At Line 5, the RUN method 320A sends a first message. The first message invokes a method at some other object instance (not shown in FIG. 3). The operation of the method invoked by the first message depends on the nature of the application module 230 and the nature of the user command entered in Step 606. For example, if the application module 230 implements an automated banking teller machine, then the method invoked by the first message may operate to transfer funds between a checking account and a savings account.

Note that the method invoked by the first message may contain multiple committable actions and commit messages. If this is the case, then the method invoked by the first message would also be implemented according to the general format in Table 4 in order to implement the recovery systems and methods of the present invention. Also, a recovery object similar to the recovery object 330A would be associated with the method invoked by the first message.

At Line 6, the RUN method 320A increments the counter to 2. The counter is not committed to the external databases 234 at this point.

At Line 7, the RUN method 320A commits the committable data to the external databases 234. The committable data that was created (but not committed) by the method invoked by the first message are committed at this point. Also, the counter is committed at this point.

Under certain conditions, it is possible to optimize the RUN method 320A to minimize the number of commits and thus reduce processing time for recovery operations. If a single commit message is sent in the method invoked by the first message, then the commit message in Line 7 can be deleted if the counter is incremented before the first message is sent (that is, lines 5 and 6 are switched). The commit in the method invoked by the first message would then be responsible for committing the counter.

The RUN method 320A then executes Lines 10-12, associated with the If statement at Line 8, since the counter equals 2. Lines 10-12 correspond to the second step of the RUN method 320A. As shown in Table 4, the format of Lines 10-12 is similar to the format of Lines 5-7. Thus, the operation of Lines 10-12 is similar to the operation of Lines 5-7. Of course, the second message sent by the RUN method 320A (at Line 10) may invoke a different method than that invoked during the first step.

Steps 3-7 of the RUN method 320A are not explicitly shown in Table 4. These steps are represented by Lines 13-17. The operation of Steps 3-7 is similar to the operation of Lines 5-7 of the first step of the RUN method 320A.

Step 7 increments the counter to 8 (and then commits the counter to the external databases 234). The RUN method 320A then executes Lines 20-22, associated with the If statement at Line 18, since the counter equals 8. Lines 20-22 correspond to the eighth and final step of the RUN method 320A. The RUN method 320A has eight steps, although other RUN methods may have a different number of steps depending on their function.

In Line 20, the RUN method 320A sends a last message. The last message invokes a method at another object. Again, the method invoked in this step may not be the methods invoked in Steps 1-7.

In Line 21, the RUN method 320A deletes the recovery object 330A. At this point, the deleted recovery object 330A is not committed to the external databases 234.

At Line 22, the RUN method 320A commits the committable data to the external databases 234. The committable data that was created (but not committed) by the method invoked by the last message are committed at this point. Also, the deletion of the recovery object 330A and its counter is committed at this point.

Following the execution of Line 22, the RUN method 320A is complete and thus returns at Line 26.

Referring again to FIG. 6, in Step 618 control is returned to the interactive dialog manager 302.

The manner in which the application program 238 recovers from unplanned failures during interactive processing according to the present invention is discussed below with reference to FIG. 6 and Table 4.

Referring first to Table 4, suppose an unplanned failure occurs after the RUN method 320A executes Line 7.

Referring now to FIG. 6, in Step 624 (after power-up of the computer platform 202) the user 232 interacts with the interactive dialog manager 302 to determine a status of the user command entered in Step 606. The interactive dialog manager 302 informs the user 232 that the user command entered in Step 606 did not complete.

In Step 628, the user re-enters the user command Recall that the user command includes both the selected command option and the selected object representation.

Step 610 is then performed as above. Specifically, the interactive dialog manager 302 identifies the persistent object 318 as containing the persistent object method 320A for performing the function indicated by the user command. Then, the interactive dialog manager 302 associates the user command with the persistent object 318 and the RUN method 320A. Then, the interactive dialog manager 302 sends a RUN message 312 to the persistent object 318 to invoke the RUN method 320A.

In Step 614, the RUN method 320A is executed. Referring now to Table 4, since the recovery object 330A exists the RUN method 320A goes to Line 3. Recall that the unplanned failure occurred after Line 7. Thus, the counter equals 2.

Since the counter equals 2, the first step of the RUN method 320A is not executed. Rather, execution of the RUN method 320A starts with the second step at Line 8. Therefore, according to the recovery systems and methods of the present invention, the steps which were executed prior to the unplanned failure are not re-executed. The steps that were not executed prior to the unplanned failure are executed using the return values and state data stored in the data 336 of the recovery object 330A Suppose an unplanned failure occurred after the RUN method 320A executed line 22. After line 22 is executed, the RUN method 320A is essentially complete and the recovery object 330A no longer exists. Therefore, upon restart the RUN method 330A should simply exit. Specifically, when the RUN method 320A is restarted (in Step 614 of FIG. 6), the If statement at Line 1 in Table 4 is false. As a result, the RUN method 330A correctly begins executing at Line 24. After performing a "no-operation" in Line 25, the RUN method 330A exits in Line 26.

3.2. Batch Processing

Figure 7:
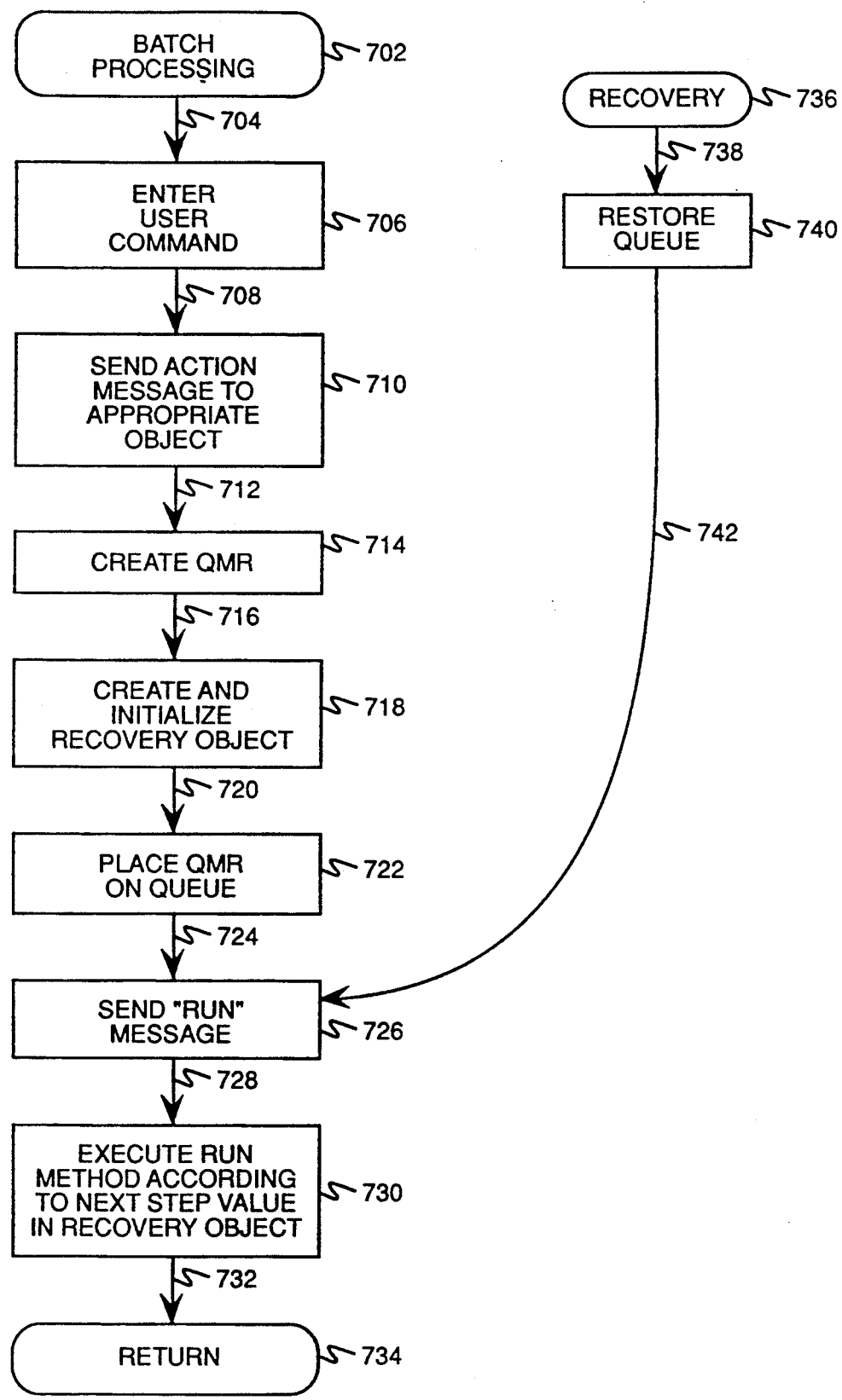
FIG. 7 shows an operational flowchart of the present invention while operating in a batch processing mode.

Batch processing occurs when the users 232 submit user commands to the application program 238 for processing at a later time. FIG. 7 presents an operational flowchart of the application program 238 while operating in the batch processing mode. FIG. 7 focuses on the manner in which the application program 238 prepares for and recovers from unplanned failures.

Referring to FIGS. 3 and 7, in Step 706 the user 232 enters a user command. The user command is sent to the interactive dialog manager 302. Recall that the user command includes both the selected command option and the selected object representation (as discussed above with reference to FIG. 5).

Step 710 is then performed. The operation of Step 710 is similar to the operation of Step 610 in FIG. 6. Specifically, the interactive dialog manager 302 identifies a persistent object 322 as containing a persistent object method 324 for performing the function indicated by the user command. Then, the interactive dialog manager 302 associates the user command with the persistent object 322 and the method 324. Then, the interactive dialog manager 302 sends a message 314 to the persistent object 322 to invoke the method 324.

The persistent object instance 322 is implemented as part of the application program 238 of the present invention. The method 324 associated with the persistent object instance 322 performs a number of functions. First, the method 324 creates a queued message request 332 in Step 714. The queued message request (QMR) 332 is an object instance. As described below, the QMR 332 may or may not be persistent. If the QMR 332 is persistent, then the QMR 332 can also function as a recovery object 330B.

The QMR 332 includes a RUN method 320B and data 44. The format of the RUN method 320B is as shown in Table 4.

To create the QMR 332, the method 324 selects a object class containing the RUN method 320B which is adapted to perform the user command (entered in Step 706). The method 324 then instantiates an object instance of the selected object class. The instantiated object instance represents the QMR 332.

In Step 718 the method 324 creates and initializes a recovery object 330B. The recovery object 330B is persistent and is associated with the QMR 332. The method 324 initializes recovery data 338 to indicate the first step in the RUN method 320B of the QMR 332. The method 324 then assigns the object identifier of the recovery object 330B to the data 344 of the QMR 332 so that the RUN method 320B of the QMR 32 can later access and use the recovery object 330B. The method 324 then commits the recovery object 330B (and the QMR 332, if the QMR 332 is persistent) to the external databases 234.

The method 324 also identifies all object instances that are referenced by the RUN method 320B. These object instances are called referenced object instances. Then, the method 324 stores the object identifiers of the referenced object instances in the data 344, and commits the data 344 to the external databases 234, so that the RUN method 320B of the QMR 332 can later access the referenced object instances.

In Step 722, the method 324 places the QMR 332 on the queue 310. As noted above, the recovery object 330B and the referenced object instances are referenced by the RUN method 320B via the object identifiers stored in the data 344.

In Step 726, the queued message manager 308 schedules the QMR 332 for execution and sends a RUN message (not shown in FIG. 3) to the QMR 332 to invoke the RUN method 320B. The manner in which the queued message manager 308 performs Step 726 is described above with reference to FIG. 4.

In Step 730, the RUN method 320B is executed. The execution of the RUN method 320B is similar to the execution of the RUN method 320A. Therefore, for a description of the execution of the RUN method 320B, see the above discussion relating to the execution of the RUN method 320A.

In Step 734, the RUN method 320B is complete and control returns to the queued message manager 308.

The manner in which the application program 238 recovers from unplanned failures during batch processing according to the present invention is discussed below.

In Step 740, after power-up of the computer platform 202, the queue 310 is restored. All QMRs which were in the queue 310 prior to the unplanned failure are placed back into the queue 310. As noted above, the queued message manager 308 is responsible for managing the queue 310. However, the responsibility for maintaining the physical queue 310 (and for restoring the queue 310 after unplanned failures) may rest with either the queued message manager 308 or with the operating system 206. If the queued message manager 308 has the responsibility for maintaining the physical queue 310, then the QMRs are persistent objects However, if the operating system 206 has the responsibility for maintaining the physical queue 310, then the QMRs are not persistent objects from the perspective of the object oriented environment module 236.

Figure 4:
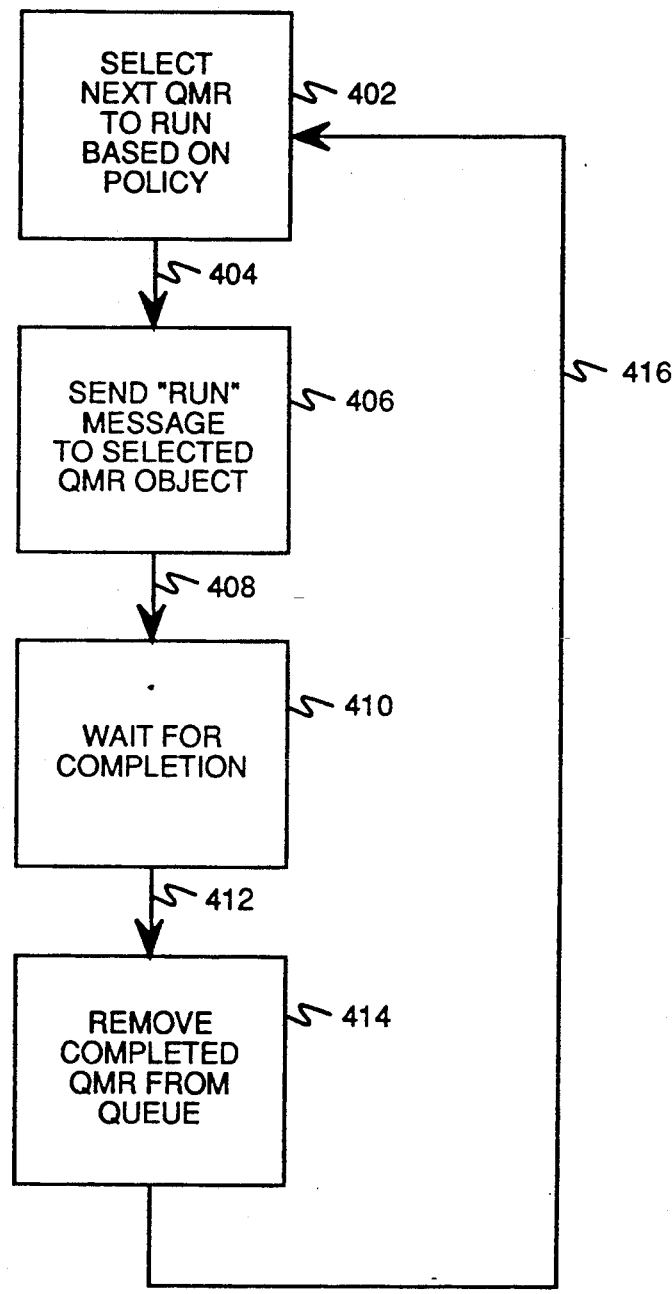
FIG. 4 shows an operational flowchart of a queued message manager.

Referring to FIG. 4, the queued message manager 308 does not remove a QMR from the queue 310 (in Step 414) until the QMR completes (after Step 410). Therefore, because the QMR 332 was executing (that is, the queued message manager 308 was waiting in Step 410) when the unplanned failure occurred, the QMR 332 was never removed from the queue 310. As a result, in Step 726, the queued message manager 308 reschedules and sends the RUN message (the same RUN message that was originally sent) to the RUN method 320B of the QMR 332.

In Step 730, the RUN method 320B executes according to the recovery data 338 in the recovery object 330B. The execution of the RUN method 320B during recovery is similar to the execution of the RUN method 320A during recovery. Therefore, for a description of the execution of the RUN method 320B during recovery, see the discussion above regarding the RUN method 320A.

3.3. Remote Processing

Figure 8:
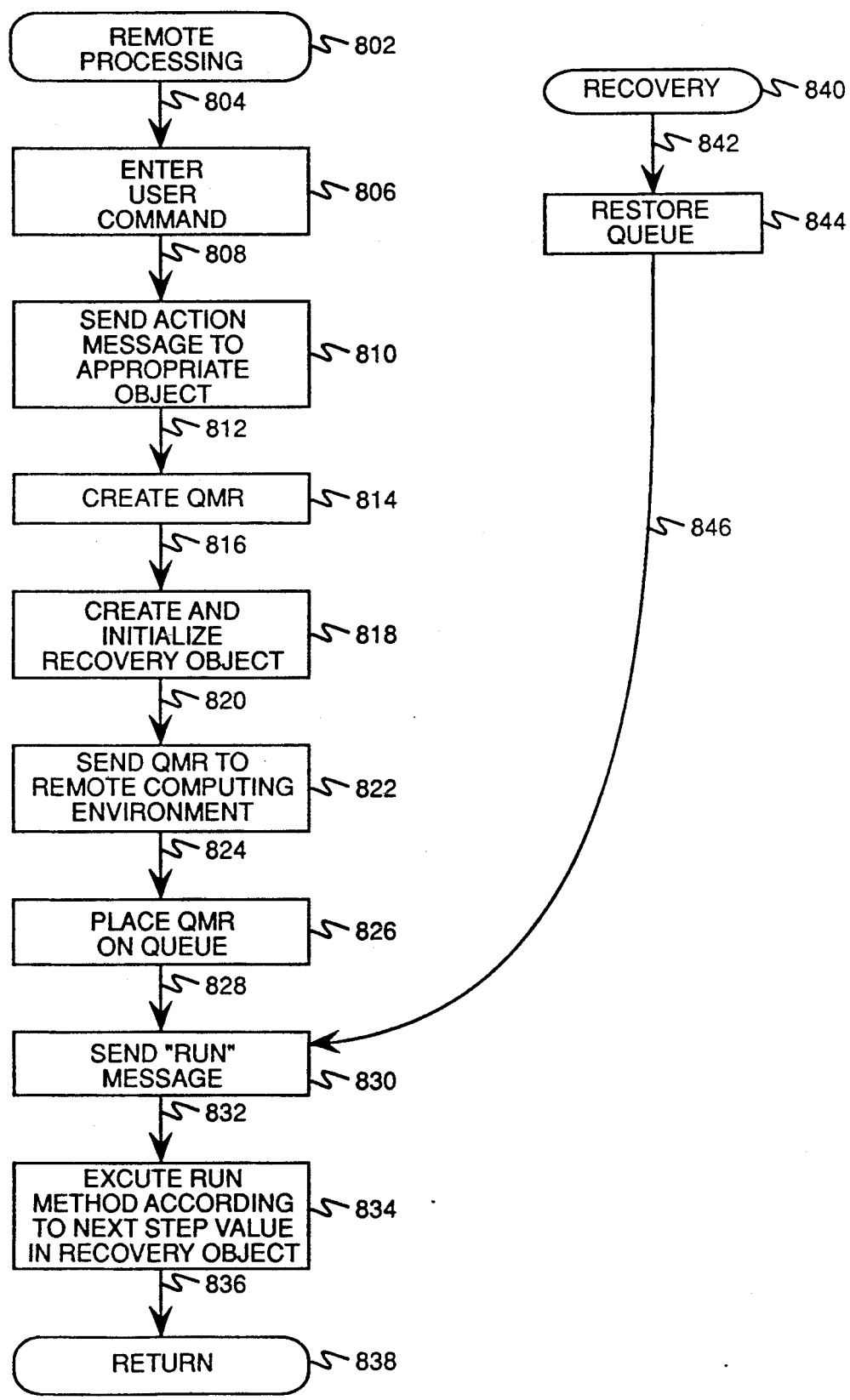
FIG. 8 shows an operational flowchart of the present invention while operating in a remote processing mode.

Remote processing occurs when the users 232 submit user commands to the application program 238 for processing at remote object oriented environments. The remote object oriented environments may exist on the same or on a different computing platform 202. FIG. 8 presents an operational flowchart of the application program 238 while operating in the remote processing mode. FIG. 8 focuses on the manner in which the application program 238 prepares for and recovers from unplanned failures.

Referring to FIGS. 3 and 8, in Step 806 the user 232 enters a user command. The user command is sent to the interactive dialog manager 302. Recall that the user command includes both the selected command option and the selected object representation (as discussed above with reference to FIG. 5).

Step 810 is then performed. The operation of Step 810 is similar to the operation of Step 610 in FIG. 6. Specifically, the interactive dialog manager 302 identifies a persistent object 326 as containing a persistent object method 328 for performing the function indicated by the user command. Then, the interactive dialog manager 302 associates the user command with the persistent object 326 and the method 328. Then, the interactive dialog manager 302 sends a message 316 to the persistent object 326 to invoke the method 328.

The persistent object instance 326 is implemented as part of the application program 238 of the present invention. The method 328 associated with the persistent object instance 326 performs a number of functions. First, the method 328 creates a queued message request 334 in Step 814. The queued message request (QMR) 334 is an object instance. As noted above, the QMR 334 may or may not be persistent.

The QMR 334 includes a RUN method 320C and data 346. The format of the RUN method 320C is as shown in Table 4.

To create the QMR 334, the method 328 selects a object class containing the RUN method 320C which is adapted to perform the user command (entered in Step 806). The method 328 then instantiates an object instance of the selected object class. The instantiated object instance represents the QMR 334.

In Step 818 the method 328 creates and initializes a recovery object 330C. The recovery object 330C is persistent and is associated with the QMR 334. The method 328 initializes recovery data 340 to indicate the first step in the RUN method 320C of the QMR 334. The method 328 then assigns the object identifier of the recovery object 330C to the data 346 of the QMR 334 so that the RUN method 320C of the QMR 334 can later access and use the recovery object 330C. The method 328 then commits the recovery object 330C (and the QMR 334, if the QMR 334 is persistent) to the external databases 234.

The method 328 also identifies all object instances that are referenced by the RUN method 320C. These object instances are called referenced object instances. Then, the method 328 stores the object identifiers of the referenced object instances in the data 346, and commits the data 346 to the external databases 234, so that the RUN method 320C of the QMR 334 can later access the referenced object instances.

In Step 822, the method 328 sends the QMR 334, the recovery object 330C, and the referenced object instances to the remote object oriented environment 342.

In Step 826, the QMR 334 is placed on the queue 310 at the remote object oriented environment 342. As noted above, the recovery object 330C and the referenced object instances are referenced by the RUN method 320C via the object identifiers stored in the data 346.

In Step 830, the queued message manager 308 at the remote object oriented environment 342 schedules the QMR 334 for execution and sends a RUN message (not shown in FIG. 3) to the QMR 334 to invoke the RUN method 320C. The manner in which the queued message manager 308 performs Step 830 is described above with reference to FIG. 4.

In Step 834, the RUN method 320C is executed. The execution of the RUN method 320C is similar to the execution of the RUN method 320A. Therefore, for a description of the execution of the RUN method 320C, see the above discussion relating to the execution of the RUN method 320A.

In Step 838, the RUN method 320C is complete and control returns to the queued message manager 308 at the remote object oriented environment.

The manner in which the application program 238 recovers from unplanned failures during remote processing according to the present invention is discussed below.

In Step 844, after power-up of the remote object oriented environment, the queue 310 at the remote object oriented environment is restored. All QMRs which were in the queue 310 prior to the unplanned failure are placed back into the queue 310. As noted above, either the queued message manager 308 or the operation system 206 may have primary responsibility for the restoration of the queue 310.

Referring to FIG. 4, the queued message manager 308 does not remove a QMR from the queue 310 (in Step 414) until the QMR completes (after Step 410). Therefore, because the QMR 334 was executing (that is, the queued message manager 308 was waiting in Step 410) when the unplanned failure occurred, the QMR 334 was never removed from the queue 310. As a result, in Step 830, the queued message manager 308 reschedules and sends the RUN message (the same RUN message that was originally sent) to the RUN method 320C of the QMR 334.

In Step 834, the RUN method 320C executes according to the recovery data 340 in the recovery object 330C. The execution of the RUN method 320C during recovery is similar to the execution of the RUN method 320A during recovery. Therefore, for a description of the execution of the RUN method 320C during recovery, see the discussion above regarding the RUN method 320A.

While various embodiments of the present invention have been described above, it should be understood that they have been presented by way of example, and not limitation. Thus, the breadth and scope of the present invention should not be limited by any of the above-described exemplary embodiments, but should be defined only in accordance with the following claims and their equivalents.

What is claimed is:

1. A method for recovering from computer failures in an object oriented computing environment, said method adapted to operate on one or more computer platforms and comprising the steps of:
    (a) creating persistent recovery objects associated with object instances having object instance methods, each of said object instance methods comprising:
        (1) multiple committable actions which cannot safely be re-executed; and
        (2) multiple commit messages;
    (b) storing recovery information sufficient to recover from the failures in said recovery objects;
    (c) committing committable data, including said recovery information, to a non-volatile storage device.

2. In a computer-based system for performing work, a method adapted to operate in a local and in one or more remote object oriented computing environments, for recovering from computer failures, said method adapted to operate on one or more computer platforms and comprising the steps of:
    (a) receiving a user command which specifies the work to be performed;
    (b) creating a queued message request according to said user command, wherein said queue message request comprises a run method including:
        (1) multiple committable actions for performing the work and which cannot safely be re-executed;
        (2) multiple commit messages;
    (c) creating a recovery object comprising recovery information for said queued message request;
    (d) initializing said recovery information, such that said recovery information refers to a first of said committable actions;
    (e) identifying object instances which are referenced by said run method;
    (f) committing committable data including said recovery information to a non-volatile storage device;
    (g) placing said queued message request on a queue;
    (h) sending a run message to said run method; and
    (i) in response to said run message, executing said run method according to said recovery information;
    wherein said recovery information is sufficient to recover from the computer failures.

3. The method of claim 2, wherein step (i) comprises the steps of:
    (1) executing said committable action which is referenced by said recovery information;
    (2) updating said recovery information such that said recovery information refers to a next of said committable actions that has not been executed;
    (3) sending one of said commit messages to said recovery information to said non-volatile storage device;
    (4) repeating steps (1) – (3) until said committable actions have all been executed.

4. The method of claim 3, wherein step (i) further comprises the steps of:
    (5) restoring said queue;
    (6) sending said run message to said run method; and
    (7) performing steps (1) – (4);
    wherein steps (5) – (7) are performed if said run method has not fully executed when one of said computer failures occurs.

5. The method of claim 2, wherein said queue exists in said local object oriented computing environment.

6. The method of claim 2, wherein said queue exists in one of said remote object oriented computing environments.

7. The method of claim 6, wherein step (g) comprises the step of sending said queued message request, said recovery object, and said referenced object instances to said remote object oriented computing environment.

8. The method of claim 2, wherein said recovery object is a persistent object instance.

9. The method of claim 2, wherein said committable data in step (f) also includes said queued message request and said referenced object instances.

10. The method of claim 2, wherein step (a) comprises the steps of:
    (1) displaying a user option screen on a terminal;
    (2) waiting for said user command;
    (3) receiving said user command;
    (4) using said user command to select an object instance and an action message, wherein said object instance contains an action method associated with said action message, and wherein said action method is adapted to create said queued message request; and
    (5) sending said action message to said action method.

11. The method of claim 2, wherein step (h) comprises the step of using a selection policy to select said queued message request to execute.

12. In a computer-based system for performing work, a method adapted to operate in one or more object oriented computing environments, for recovering from computer failures, said method adapted to operate on one or more computer platforms and comprising the steps of:
    (a) receiving a user command which specifies the work to be performed;
    (b) using said user command to select an object instance, wherein said object instance comprises a run method including:
        (1) multiple committable actions for performing the work and which cannot safely be re-executed; and
        (2) multiple commit messages;
    (c) sending a run message to said run method; and (d) in response to said run message, executing said run method according to a recovery information contained in a recovery object associated with said object instance;

wherein said recovery information is sufficient to recover from the computer failures.

13. The method of claim 12, wherein said recovery information refers to a first of said committable actions, and wherein said recovery information is committed in a non-volatile storage device.

14. The method of claim 13, wherein step (d) comprises the steps of:
   (1) executing said committable action which is referenced by said recovery information;
   (2) updating said recovery information such that said recovery information refers to a next of said committable actions that has not been executed;
   (3) sending one of said commit messages to commit said recovery information to said non-volatile storage device;
   (4) repeating steps (1) – (3) until said committable actions have all been executed.

15. The method of claim 14, wherein step (d) further comprising the steps of:
   (5) receiving said user command;
   (6) using said user command to select said object instance;
   (7) sending said run message to said run method; and
   (8) performing steps (1) – (4);
   wherein steps (5) – (8) are performed if said run method has not fully executed when one of said computer failures occurs.

16. A computer-based system adapted to operate on one or more computer platforms and in one or more object oriented computing environments, for recovering from computer failures, said system comprising:
   (1) one or more object instances comprising object instance methods, each of said object instance methods comprising:
      (a) multiple committable actions which cannot safely be re-executed;
      (b) multiple commit messages;
   (2) persistent recovery objects associated with said object instances;
   (3) means for storing recovery information sufficient to recover from the failures in said recovery objects;
   (4) one or more non-volatile storage devices;
   (5) means for committing committable data including said recovery information to said nonvolatile storage devices 17. In a computer-based system for performing work, a recovery system adapted to operate on one or more computer platforms and in a local and in one or more remote object oriented computing environments, for recovering from computer failures, said recovery system comprising:
   (1) means for receiving a user command which specifies the work to be performed;
   (2) means for creating a queued message request according to said user command, wherein said queue message request comprises a run method including:
      (a) multiple committable actions for performing the work and which cannot safely be re-executed;
      (b) multiple commit messages;
   (3) means for creating a recovery object comprising recovery information for said queued message request;
   (4) means for initializing said recovery information, such that said recovery information refers to a first of said committable actions;
   (5) means for identifying object instances which are referenced by said run method;
   (6) one or more non-volatile storage devices;
   (7) means for committing committable data including said recovery information to said non-volatile storage devices;
   (8) means for placing said queued message request on a queue;
   (9) means for sending a run message to said run method; and
   (10) in response to said run message, means for executing said run method according to said recovery information;
   wherein said recovery information is sufficient to recover from the computer failures.

18. The recovery system of claim 17, wherein said means for executing comprises:
   (a) means for executing said committable action which is referenced by said recovery information;
   (b) means for updating said recovery information such that said recovery information refers to a next of said committable actions that has not been executed; and
   (c) means for sending one of said commit messages to commit said recovery information to said non-volatile storage devices.

19. The recovery system of claim 17, further comprising means for restoring said queue if one of the computer failures occurs.

20. The recovery system of claim 17, wherein said queue exists in said local object oriented computing environment.

21. The recovery system of claim 17, wherein said queue exists in one of said remote object oriented computing environments.

22. The recovery system of claim 21, wherein said means for placing comprises means for sending said queued message request, said recovery object, and said referenced object instances to said remote object oriented computing environment.

23. The recovery system of claim 17, wherein said recovery object is a persistent object instance.

24. The recovery system of claim 17, wherein said committable data also includes said queued message request and said referenced object instances.

25. The recovery system of claim 17, wherein said means for receiving a user command comprises:
   (a) means for displaying a user option screen on a terminal;
   (b) means for receiving said user command;
   (c) means for using said user command to select an object instance and an action message, wherein said object instance contains a action method associated with said action message, and wherein said action method is adapted to create said queued message request; and
   (5) sending said action message to said action method.

26. The recovery system of claim 17, wherein said means for sending a run message to said run method comprises means for using a selection policy to select said queued message request to execute.

27. In a computer-based system for performing work, a recovery system adapted to operate on one or more computer platforms and in one or more object oriented computing environments, for recovering from computer failures, said recovery system comprising:
(1) means for receiving a user command which specifies the work to be performed;
(2) means for using said user command to select an object instance, wherein said object instance comprises a run method including:
 (a) multiple committable actions for performing the work and which cannot safely be re-executed; and
 (b) multiple commit messages;
(3) one or more non-volatile storage devices;
(4) means for sending a run message to said run method; and
(5) in response to said run message, means for executing said run method according to a recovery information contained in a recovery object associated with said object instance;
wherein said recovery information is sufficient to recover from the computer failures.

28. The recovery system of claim 27, wherein said recovery information refers to a first of said committable actions, and wherein said recovery information is committed in said non-volatile storage devices.

29. The recovery system of claim 28, wherein said means for executing comprises:
(a) means for executing said committable action which is referenced by said recovery information;
(b) means for updating said recovery information such that said recovery information refers to a next of said committable actions that has not been executed; and
(c) means for sending one of said commit messages to commit said recovery information to said non-volatile storage device.

* * * * *